US010769074B2

(12) United States Patent
Bennett et al.

(10) Patent No.: US 10,769,074 B2
(45) Date of Patent: Sep. 8, 2020

(54) COMPUTER MEMORY CONTENT MOVEMENT

(71) Applicant: Microsoft Technology Licensing, LLC, Redmond, WA (US)

(72) Inventors: John G. Bennett, Clyde Hill, WA (US); Marc Tremblay, Clyde Hill, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/984,238

(22) Filed: May 18, 2018

(65) Prior Publication Data

US 2019/0138453 A1    May 9, 2019

Related U.S. Application Data

(60) Provisional application No. 62/583,942, filed on Nov. 9, 2017.

(51) Int. Cl.
*G06F 12/10* (2016.01)
*G06F 12/109* (2016.01)
(Continued)

(52) U.S. Cl.
CPC ............ *G06F 12/10* (2013.01); *G06F 12/109* (2013.01); *G06F 12/1009* (2013.01);
(Continued)

(58) Field of Classification Search
None
See application file for complete search history.

(56) References Cited

U.S. PATENT DOCUMENTS 5,680,640 A * 10/1997 Ofek ..................... G06F 3/0607
710/19
7,925,850 B1 * 4/2011 Waldspurger ......... G06F 9/4856
711/162
(Continued)

FOREIGN PATENT DOCUMENTS

CN     102495806 A    6/2012

OTHER PUBLICATIONS

"International Search Report and Written Opinion Issued in PCT Application No. PCTUS18058819", dated Mar. 14, 2019, 10 Pages.
(Continued)

*Primary Examiner* — William E. Baughman
(74) *Attorney, Agent, or Firm* — Mannava & Kang, P.C.

(57) ABSTRACT

In some examples, computer memory content movement may include ascertaining a request associated with content of computer memory. Based on a determination that the request is directed to the content that is to be moved from a source of the computer memory to a destination of the computer memory, a determination may be made as to whether the content is at the source, is in a process of being moved from the source to the destination, or has been moved from the source to the destination. Based on a determination that the content is at the source, the request may be performed using the source. Based on a determination that the content is in the process of being moved, the request may be performed using the source. Further, based on a determination that the content has been moved, the request may be performed using the destination.

18 Claims, 11 Drawing Sheets

(51) Int. Cl.
*G06F 12/1009* (2016.01)
*G06F 12/1036* (2016.01)

(52) U.S. Cl.
CPC .. *G06F 12/1036* (2013.01); *G06F 2212/1016* (2013.01); *G06F 2212/1041* (2013.01); *G06F 2212/657* (2013.01)

(56) References Cited

U.S. PATENT DOCUMENTS

| | | | |
|---|---|---|---|
| 9,311,228 B2 | 4/2016 | Daly et al. | |
| 9,619,399 B2 | 4/2017 | Agesen | |
| 9,658,781 B2 | 5/2017 | Dolph et al. | |
| 2005/0278492 A1* | 12/2005 | Stakutis | G06F 11/2082 711/161 |
| 2006/0107010 A1* | 5/2006 | Hirezaki | G06F 3/061 711/165 |
| 2008/0109629 A1 | 5/2008 | Karamcheti et al. | |
| 2008/0235477 A1 | 9/2008 | Rawson | |
| 2010/0161923 A1 | 6/2010 | Gadelrab | |
| 2012/0023302 A1* | 1/2012 | Arndt | G06F 13/28 711/165 |
| 2014/0325121 A1* | 10/2014 | Akutsu | G06F 3/061 711/103 |
| 2015/0052322 A1 | 2/2015 | Tsirkin et al. | |
| 2015/0149709 A1* | 5/2015 | Du | G06F 3/0685 711/103 |
| 2016/0148653 A1 | 5/2016 | Nale et al. | |
| 2017/0091093 A1 | 3/2017 | Wang et al. | |

OTHER PUBLICATIONS

Achtemichuk, "Understanding vSphere Active Memory", VMware vSphere Blog, Oct. 4, 2013, 15 pages. https://blogs.vmware.com/vsphere/2013/10/understanding-vsphere-active-memory.html.

\* cited by examiner

700

ASCERTAIN A REQUEST ASSOCIATED WITH CONTENT OF COMPUTER MEMORY
702

DETERMINE, BASED ON AN ANALYSIS OF A MAP PAGE TABLE, WHETHER THE REQUEST IS DIRECTED TO THE CONTENT THAT IS TO BE MOVED FROM A SOURCE OF THE COMPUTER MEMORY TO A DESTINATION OF THE COMPUTER MEMORY
704

BASED ON A DETERMINATION THAT THE REQUEST IS DIRECTED TO THE CONTENT THAT IS TO BE MOVED FROM THE SOURCE TO THE DESTINATION, DETERMINE WHETHER THE CONTENT IS AT THE SOURCE, IS IN A PROCESS OF BEING MOVED FROM THE SOURCE TO THE DESTINATION, OR HAS BEEN MOVED FROM THE SOURCE TO THE DESTINATION
706

BASED ON A DETERMINATION THAT THE CONTENT IS AT THE SOURCE, PERFORM THE REQUEST ASSOCIATED WITH THE CONTENT USING THE SOURCE
708

BASED ON A DETERMINATION THAT THE CONTENT IS IN THE PROCESS OF BEING MOVED FROM THE SOURCE TO THE DESTINATION, PERFORM THE REQUEST ASSOCIATED WITH THE CONTENT USING THE SOURCE
710

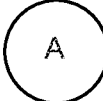

FIG. 7

COMPUTER MEMORY CONTENT MOVEMENT

PRIORITY

This application is a Non-Provisional application of commonly assigned and U.S. Provisional Application Ser. No. 62/583,942, filed Nov. 9, 2017, the disclosure of which is hereby incorporated by reference in its entirety.

BACKGROUND

A computer system may include various types of computer memory. For example, the computer memory may include random access memory (RAM) that is used for primary storage in a computer system. The computer system may also include read-only memory, flash memory, magnetic computer storage devices, etc.

The computer memory may be non-uniform in that different tiers of the computer memory may include different values for qualities including latency, throughput, endurance, and capacity. Latency may be described as a delay before a transfer of data or execution of a command begins following an associated instruction for transfer of the data or execution of the command. Throughput may be described as a rate at which data may be read from or stored into the computer memory. Further, endurance may be described as the number of program and/or erase cycles that may be applied to the computer memory before the computer memory becomes unreliable. Capacity may be described as a size of storage available to store content.

In order to optimize the computer system performance, content in the computer memory may need to be moved, for example, for re-allocation of the computer memory. For example, content in the computer memory may need to be placed in an appropriate tier of the computer memory. In this regard, there may be situations where the content is to be moved from one physical location to another, without stopping or otherwise delaying the possible users of the computer memory. For example, for an hypervisor in a non-uniform memory system, a specified portion of the computer memory may need to be relocated between different physical locations. In this regard, it is technically challenging to relocate the specified portion of the computer memory without any interruption with respect to usage of the specified portion of the computer memory. For example, usage of the specified portion of the computer memory may include direct memory access from peripheral devices such as a network or a solid-state drive (SSD), and a hypervisor may not be aware of how or when the direct memory access may be scheduled. In this regard, it is technically challenging to move memory blocks in such a way that the memory block user perceives no interruption or error.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
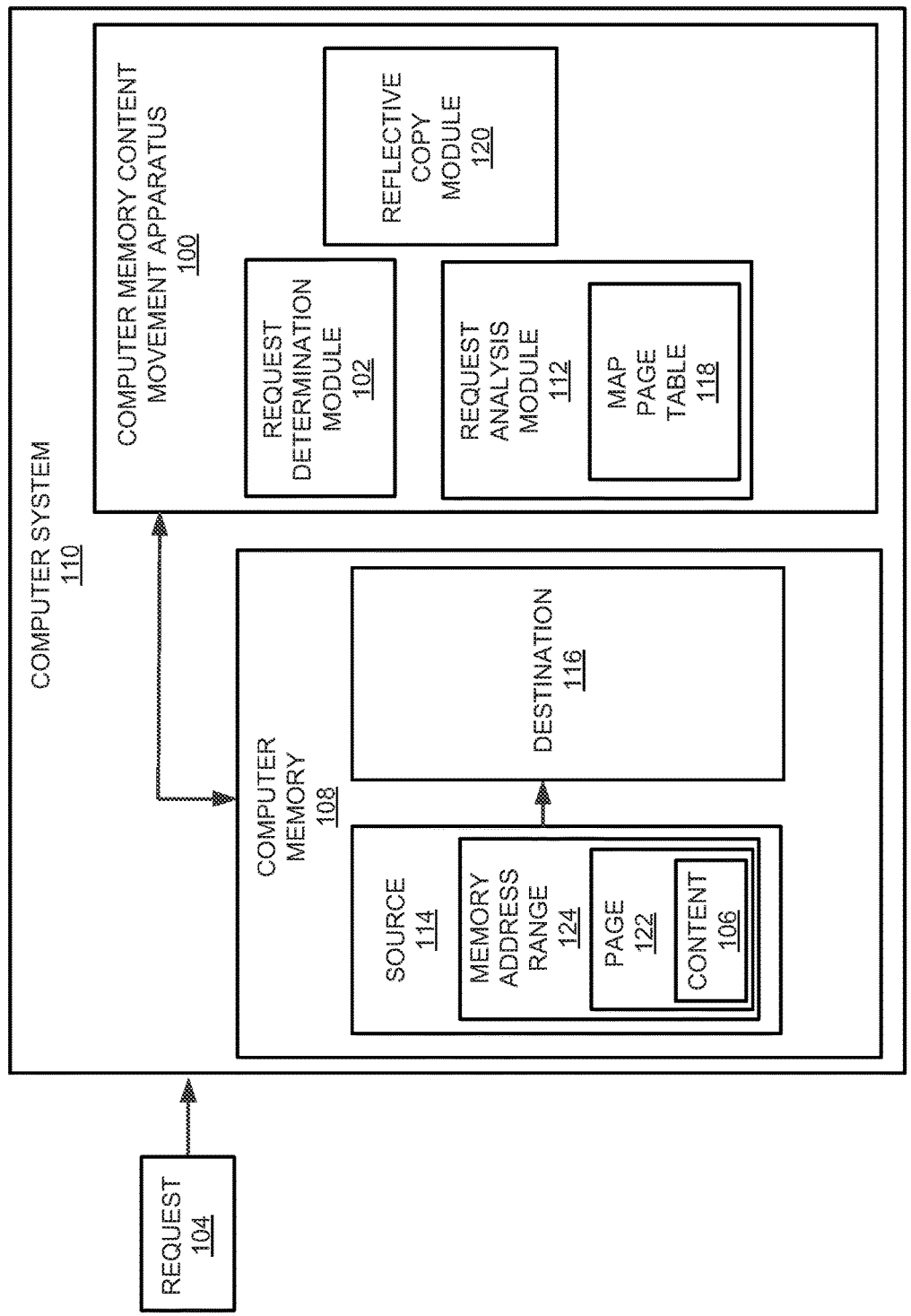
FIG. 1 illustrates a layout of a computer memory content movement apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for computer memory content movement, methods for computer memory content movement, and non-transitory computer readable media having stored thereon machine readable instructions to provide computer memory content movement are disclosed herein. The apparatuses, methods, and non-transitory computer readable media disclosed herein address at least the aforementioned technical challenges by providing for continuous use of computer memory while content of the computer memory is moved from a source of the computer memory to a destination of the computer memory. That is, for a computer system that may include a plurality of classes (e.g., tiers) of computer memory, and content is to be moved between different locations associated with the computer memory, the apparatuses, methods, and non-transitory computer readable media disclosed herein may provide for such content movement in a manner that is not visible (e.g., transparent) to guest devices such as guest virtual machines. In this regard, the content may be transparently moved between memory sub-systems of the same or different characteristics. According to examples, a hypervisor or host process within the hypervisor may control the movement of the content.

For the apparatuses, methods, and non-transitory computer readable media disclosed herein, the content may be moved from one physical memory location to another physical memory location, while maintaining that a virtual machine has access to the current version of the content. From the point of a virtual machine that requests access to the content, the virtual machine may operate using the same logical address at all times. The physical address associated with the content may be changed as follows. At the beginning, the physical address of the content may be the source range where that content is located. Upon deciding to move the content, the movement will have a destination, which is a different physical address range which currently does not contain the content. To move the content from the source to the destination, while the virtual machine sees the same virtual address (e.g., logical address) for the content at all times, the virtual machine may not perceive occurrence of the movement.

The apparatuses, methods, and non-transitory computer readable media disclosed herein may utilize a map page table to provide for continuous use of the computer memory while the content of the computer memory is moved. The movement of the content may be for the purpose of copying the content from the source to the destination. In this regard, a user of the computer memory may be temporarily redirected to a reflective copy module that performs a reflective copy function including tracking of the state of a move, and redirecting user access to either the source or the destination, depending upon how the progress of the move defines a current state of the move. When the move is complete, the page table may be updated to point to the destination, and the reflective copy function may be used for a different move.

According to examples, the apparatuses, methods, and non-transitory computer readable media disclosed herein may provide an operating system (OS), a hypervisor, or another such device, to be able to move content from one physical device to another while the content remains in active use by both code and devices, where the use of the content may migrate from a previous physical location (e.g., a source) to a new physical location (e.g., a destination). In this regard, the apparatuses, methods, and non-transitory computer readable media disclosed herein may provide for continuous operation of a hypervisor (or another device) so that is no pause in the hypervisor functionality during a move, including no interruptions or failure of direct memory access activity.

According to examples, the apparatuses, methods, and non-transitory computer readable media disclosed herein may include the reflective copy module to move (e.g., by copying) content from a source to a destination. The reflective copy module may advertise an address range of a same size as a page that includes the content, where the page may be moved from the source to the destination. The reflective copy module may implement any reads or writes within its own range by referencing either the source or the destination, depending upon the progress of the move. The move of the content may be combined with a particular ordering of changing of the mapping in a page table from the source, to the reflective copy module, to the destination, in combination with preparation, operation, and completion of a move.

According to examples, the apparatuses, methods, and non-transitory computer readable media disclosed herein may provide for transparency of movement of content from a source to a destination. In this regard, the apparatuses, methods, and non-transitory computer readable media disclosed herein may provide the ability to move content from one physical location to another physical location, and to convert guest (e.g., a user of the computer memory) use from one physical location to another physical location, without any pause in input/output activity the guest may be conducting. The apparatuses, methods, and non-transitory computer readable media disclosed herein may provide for a hypervisor to be able to continually adjust memory occupancy to achieve balance between different physical types of memory, or between local and more distant memory. The apparatuses, methods, and non-transitory computer readable media disclosed herein may operate independently of a particular cache hierarchy in the central processing unit (CPU), and may be applicable to relatively large pages (e.g., 2 MB, 1 GB, etc.).

According to examples, the apparatuses, methods, and non-transitory computer readable media disclosed herein may be implemented by programming a section of a field-programmable gate array (FPGA), or another such device.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor-executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an apparatus for computer memory content movement (hereinafter also referred to as "apparatus 100") according to an embodiment of the present disclosure.

Referring to FIG. 1, the apparatus 100 may include a request determination module 102 to ascertain a request 104 associated with content 106 of computer memory 108. The computer memory 108 may be included in a computer system 110.

A request analysis module 112 may determine whether the request 104 is directed to the content 106 that is to be moved from a source 114 of the computer memory 108 to a destination 116 of the computer memory 108.

According to examples, the request analysis module 112 may determine, based on an analysis of a map page table 118, whether the request 104 is directed to the content 106 that is to be moved from the source 114 to the destination 116. The map page table 118 may include an indication of whether the content 106 is located at the source 114, at the destination 116, or is to be moved from the source 114 to the destination 116. In this regard, the request analysis module 112 may determine, by using the page table 118, that a memory region requested by a guest is located successively at the physical source 114, at the address of a reflective copy module 120, and finally at the physical destination 116, and this determination may guide memory requests on behalf of the guest to be performed originally by the source memory, then by the reflective copy module 120 for the duration of the move, and then by the destination memory after the move is complete.

According to examples, the source 114 and the destination 116 may be assigned to different performance tiers of the computer memory 108. For example, the different performance tiers may include different qualities including latency, throughput, endurance, etc.

Based on a determination that the request 104 is directed to the content 106 that is to be moved from the source 114 to the destination 116, the reflective copy module 120 may determine whether the content 106 is at the source 114, is in a process of being moved from the source 114 to the destination 116, or has been moved from the source 114 to the destination 116.

Based on a determination that the content 106 is at the source 114, the reflective copy module 120 may perform the request 104 associated with the content 106 using the source 114.

Based on a determination that the content 106 is in the process of being moved from the source 114 to the destination 116, the reflective copy module 120 may perform the request 104 associated with the content 106 using the source 114.

Based on a determination that the content 106 has been moved from the source 114 to the destination 116, the reflective copy module 120 may perform the request 104 associated with the content 106 using the destination 116.

According to examples the computer memory 108 may include a page 122 that includes the content 106. In this regard, the page may be moved from the source 114 to the destination 116. Further, the reflective copy module 120 may determine, for the page 122 that includes an associated memory address range 124, whether the content 106 is included in a portion of the memory address range 124 for which all contents have been moved from the source 114 to the destination 116. Based on a determination that the content 106 is included in the portion of the memory address range 124, the reflective copy module 120 may perform the request 104 associated with the content 106 using the destination 116. Further, based on a determination that the content 106 is not included in the portion of the memory address range 124, the reflective copy module 120 may perform the request 104 associated with the content 106 using the source 114. Thus, with respect to a move, the reflective copy module 120 may be prepared with the source 114 and the destination 116, and enabled to begin reflecting. The page table 118 may direct guest accesses to the reflective copy module 120, where copying may be activated, and upon completion of the copy, the page table 118 may be changed to direct guest accesses to the destination 116, after which the reflective copy module 120 may be stopped and reset. The source physical memory may now be assigned to other uses.

Figure 2:
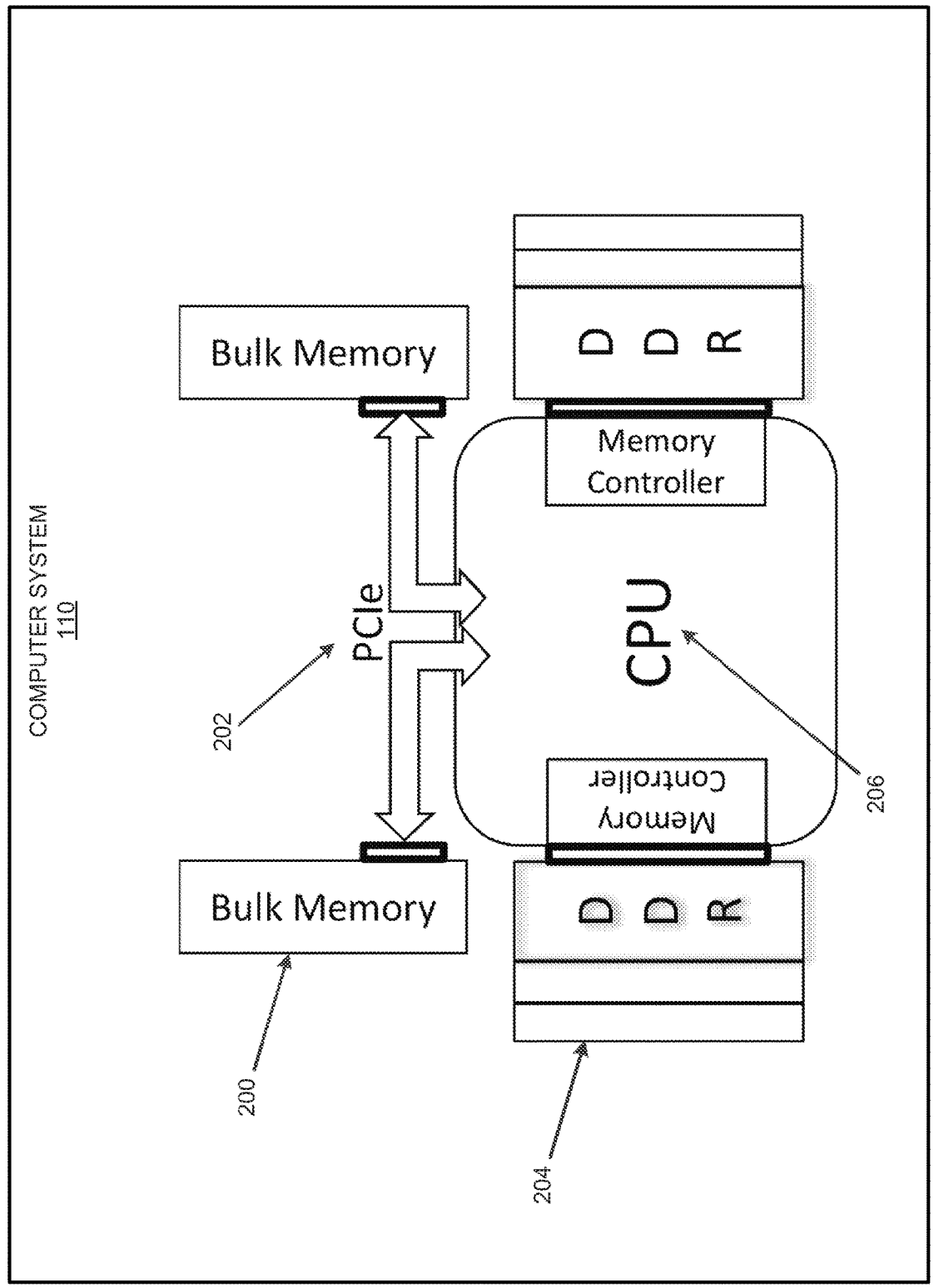
FIG. 2 illustrates an example of a layout including bulk memory and memory accessible via double data rate (DDR) interface standards (e.g., DDR4, DDR5, etc.) for the computer memory content movement apparatus of FIG. 1 in accordance with an embodiment of the present disclosure.

FIG. 2 illustrates an example of a layout including bulk memory and memory accessible via DDR interface standards (e.g., DDR4, DDR5, etc.) for the apparatus 100 in accordance with an embodiment of the present disclosure.

Referring to FIG. 2, pages that include relatively limited usage (e.g., where the usage for a time duration is under a specified threshold) may be accessed from bulk memory at 200 via an input/output bus such as peripheral component interconnect express (PCIe) 202, and pages that include higher usage (e.g., where the usage for a time duration exceeds a specified threshold) may be moved by the reflective copy module 120 into the memory at 204 accessible via DDR4 or DDR5 interface standards. Further, if needed, the reflective copy module 120 may move the most highly used pages (e.g., where the usage for a time duration exceeds a specified high threshold) of memory into dynamic random-access memory (DRAM) dual in-line memory modules (DIMMs) (not shown). Similarly, for pages in the DRAM that are no longer the most highly used, the reflective copy module 120 may move such pages to the memory accessible via DDR4 or DDR5 interface standards, or to the bulk memory. The bulk memory may be described as high-capacity memory used in connection with the computer system 110 for bulk storage of large quantities of data, e.g., flash disk, RAM, etc.

The pages in the bulk memory at 200 may be assigned by the map page table 118. Since the bulk memory at 200 may represent the largest part of the computer memory 108, most pages may be located in the bulk memory at 200. This is because for increased performance, a majority of the memory at 204 may need to remain unused.

As disclosed herein, for pages that include a relatively large number of accesses (e.g., read and/or write accesses), such pages may be moved by the reflective copy module 120 into the DRAM (not shown). For pages in the DRAM that are no longer the most highly used, the reflective copy module 120 may move such pages to the memory accessible via DDR4 or DDR5 interface standards, or to the bulk memory. Movement of the pages from the DRAM to the memory accessible via DDR4 or DDR5 interface standards, or to the bulk memory may provide space in the DRAM for other such pages to be promoted to the DRAM.

Figure 3:
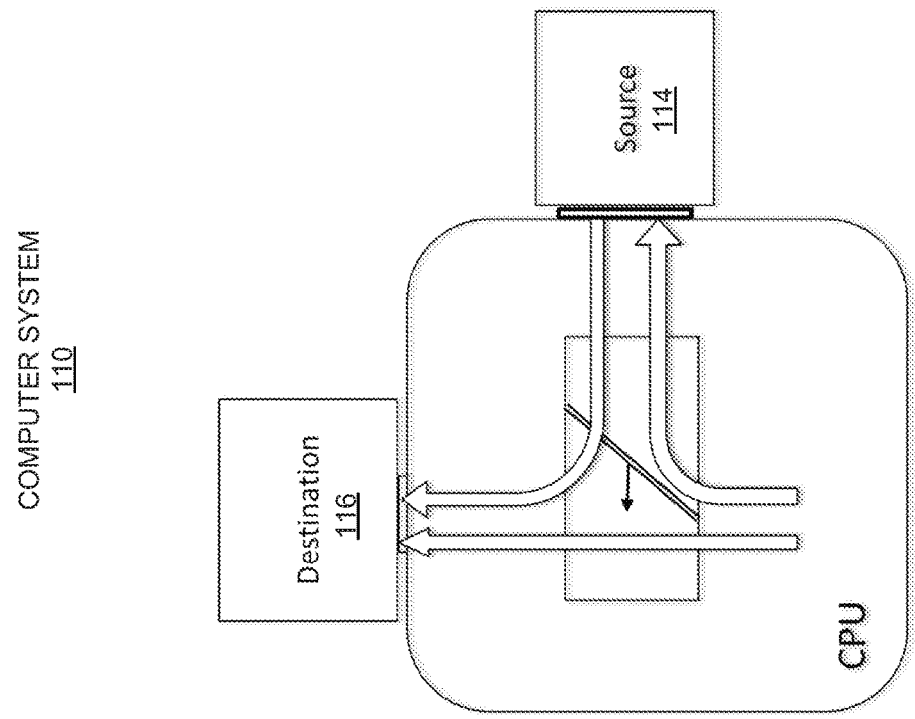
FIG. 3 illustrates an example of movement of content in active use from a source to a destination for the computer memory content movement apparatus of FIG. 1 in accordance with an embodiment of the present disclosure.

FIG. 3 illustrates an example of movement of content in active use from a source to a destination for the apparatus 100 in accordance with an embodiment of the present disclosure.

Referring to FIG. 3, if there is a page 122 in the computer memory 108 that needs to be moved to a different physical range, the reflective copy module 120 may maintain consistency with concurrent writes to the same memory. The reflective copy module 120 may use a copy operation denoted as a fold operation. The fold operation may be implemented in FPGA, in an application-specific integrated circuit (ASIC), in the CPU, or in another suitable component of the computer system 110. The fold operation may provide for the memory address range 124 to be copied while still in use, for example, by guest virtual machines. The fold operation may be described as a sequential copy of a block which tracks the address below which memory has been copied, and above which the memory is not yet copied, where the address may be denoted the fold address.

The fold may move sequentially through the page 122, copying by reading an item (e.g., a cache line size) of the content 106 from the source 114 and writing it to the destination 116. If an outside operation (e.g., the request 104) is directed to the memory address range 124, then the reflective copy module 120 may perform the operation using either to the bulk memory or to the DDR, according to how far the copy has progressed (e.g., where the "fold" is). If a concurrent write coincides exactly at the fold, then the fold may either incorporate the change, or alternatively, the fold may cancel and retry part of the copy, so as to be consistent and not lose the written value.

In this manner, the reflective copy module 120 may enable a transparent move of the content 106 from the source 114 to the destination 116. The hypervisor may use the reflective copy module 120 in conjunction with page tables to effect the move of the content 106 transparently. The move may be transparent to any CPU operation or device input/output which uses guest address spaces, which may be managed by the hypervisor and translated to physical addresses by the page table 118 entries.

The source 114 and the destination 116 may be any memory type. For example, the reflective copy module 120 may move the content 106 between bulk memory (e.g., the source or the destination) and DRAM (e.g., the destination or the source). Alternatively or additionally, the reflective copy module 120 may move the content 106 from DRAM to DRAM, or from bulk memory to bulk memory, and generally between sockets, etc. The aspect of moving the content 106 from DRAM to DRAM, or from bulk memory to bulk memory, etc., may provide for rebalancing of workloads in a multiple socket machine.

Figure 4:
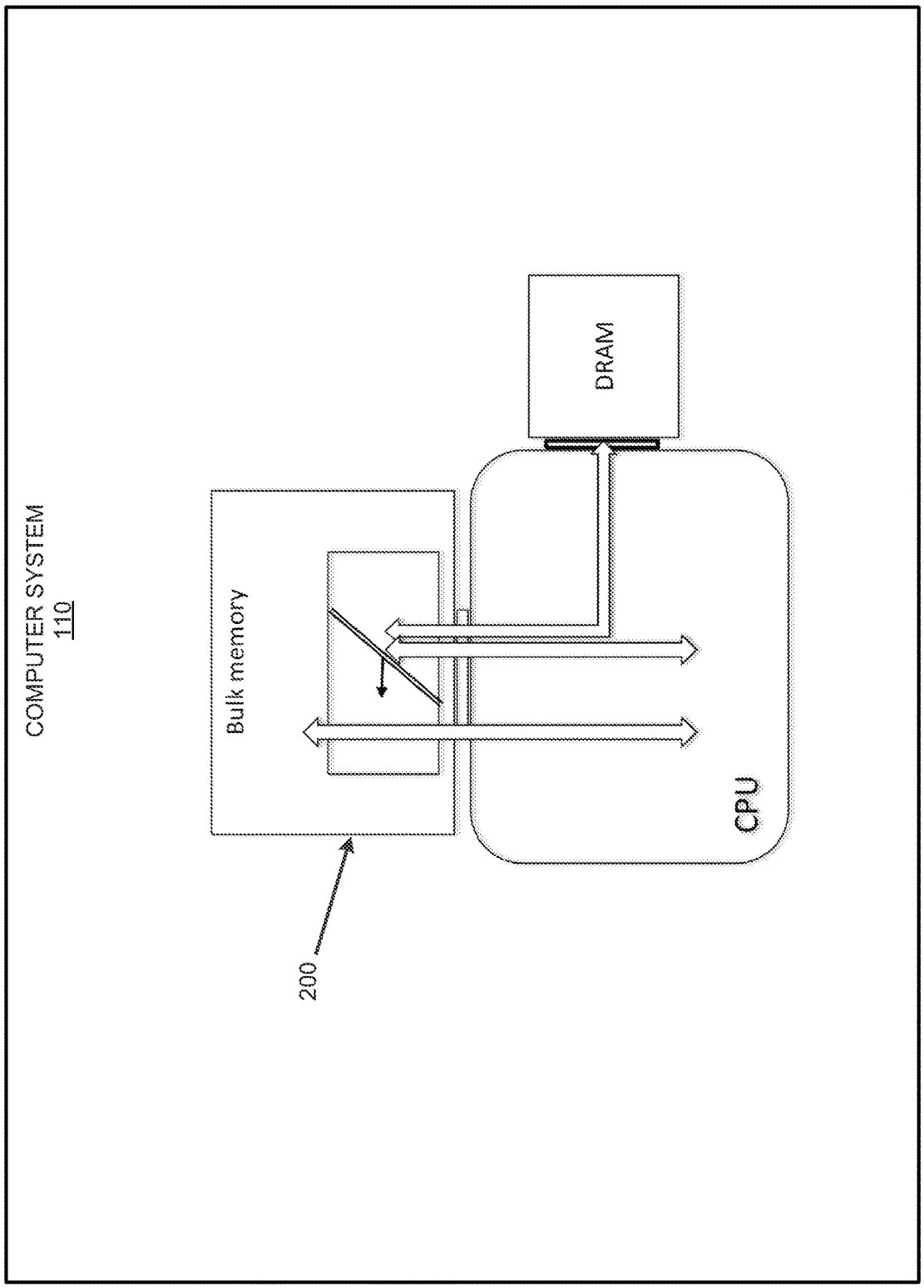
FIGS. 4 and 5 illustrate examples of implementation of a reflective copy function for the computer memory content movement apparatus of FIG. 1 in accordance with an embodiment of the present disclosure.
Figure 5:
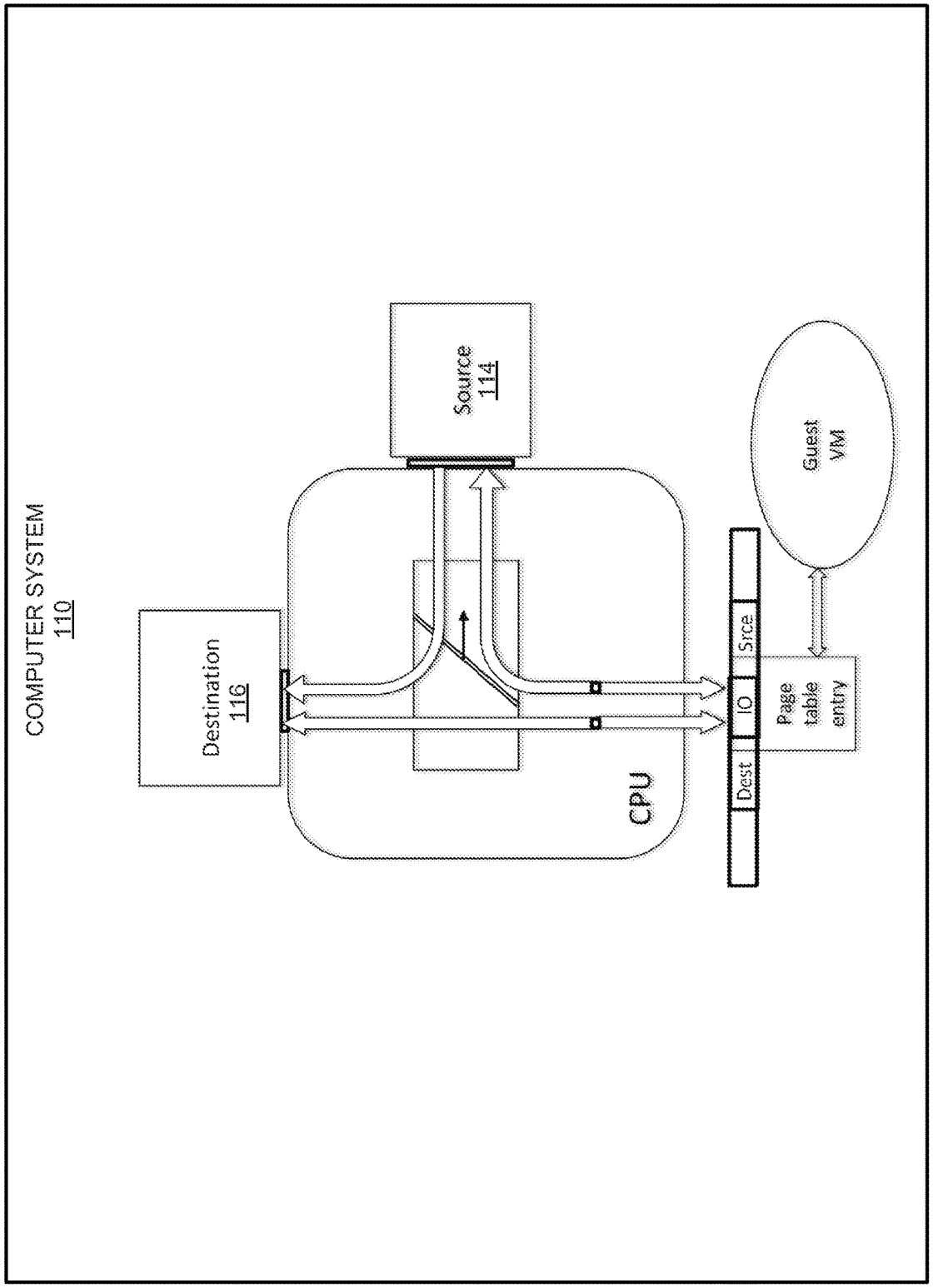

FIGS. 4 and 5 illustrate examples of implementation of a reflective copy function for the apparatus 100 in accordance with an embodiment of the present disclosure.

Referring to FIGS. 1 and 4, the computer system 110 may include a plurality of the reflective copy modules located at various positions of the computer system 110. For example, the reflective copy module 120 may be located on the CPU. Alternatively or additionally, the reflective copy module 120 may be located on a bulk memory controller of the bulk memory at 200, since a majority of the traffic for folding may involve the bulk memory. Alternatively or additionally, the reflective copy module 120 may be located in a separate FPGA device.

According to examples, a number of the reflective copy modules may correspond to a number of CPU sockets, or more than one reflective copy module 120 may be utilized per CPU socket. Alternatively or additionally, a single reflective copy module 120 may be implemented to control movement of any content from the source 114 to the destination 116. The folding activity implemented by the reflective copy module 120 may be expected to be a continuous "annealing", where the operating system or hypervisor may perform the moves at a speed that is sufficient to keep the computer system 110 balanced. The balance may be defined over an extended period of time to avoid wasted movement due to short bursts of activity. The bulk memory may absorb bursts as long as most pages are balanced in the correct location.

Referring to FIG. 5, a host (on behalf of the hypervisor) may use the reflective copy module 120 in conjunction with page tables (e.g., similar to the page table 118) to effect the move of the content 106 transparently. The reflective copy module 120 may include an address range in memory mapped input/output (which may be a write combined range, not cached with write back). This address range of the reflective copy module 120 may be equal to the size of the page 122 (e.g., the size of the memory address range 124). For example, the hypervisor pages may be 2 MB (but other sizes may be programmed, for example 4 kB or 1 GB, or on an ARM64 computer a 1 MB or 64 MB page may be utilized).

The reflective copy module 120 may be programmed, for example, by a host, with an identification of the source 114 and the destination 116. Thereafter, the second level page table 118 (e.g., the page table 118 translating guest to system physical addresses) entry for the source 114 may be changed (e.g., flipped) to point to the input/output map range of the reflective copy module 120. The reflective copy module 120 may now execute the copy operation. In this regard, the logical address used by an application that generates the request 104 may be routed to the reflective copy module 120 instead of the source 114. Thus, once the page table 118 entry is changed to point to the reflective copy module 120, the reflective copy module 120 may satisfy a read/write request by performing the request using the source 114 or the destination 116.

When the copy operation is complete, the host may update the page table 118 entry again, this time to point to the destination 116. In this regard, the page table 118 entry for that logical address is changed to point to the physical destination. After the update of the page table 118 entry to point to the destination 116 has taken effect, the reflective copy module 120 may be reset to idle or to perform another operation. The source range may no longer be used by the guest (e.g., that generates the request 104).

The reflective copy module 120 may be implemented in devices that include dual/hybrid access both through DDR and/or through PCIe.

The request 104 to the reflective copy module 120 may be based, for example, on the use of counters that perform a per-page activity count. For example, a counter may be provided for each page of the computer memory 108. Whenever a read and/or write is associated with a page, a count value may be incremented for the page. If a number of count values for a page exceed a specified threshold for a given time duration, the page may be moved to a higher specified performance tier (e.g., from bulk memory that belongs to a lower specified performance tier to DRAM that belongs to a higher specified performance tier). Alternatively, if a number of count values for a page are less than a specified threshold for a given time duration, the page may be moved to a lower specified performance tier (e.g., from DRAM to bulk memory). The request 104 may therefore correspond to movement of such pages.

Figure 6:
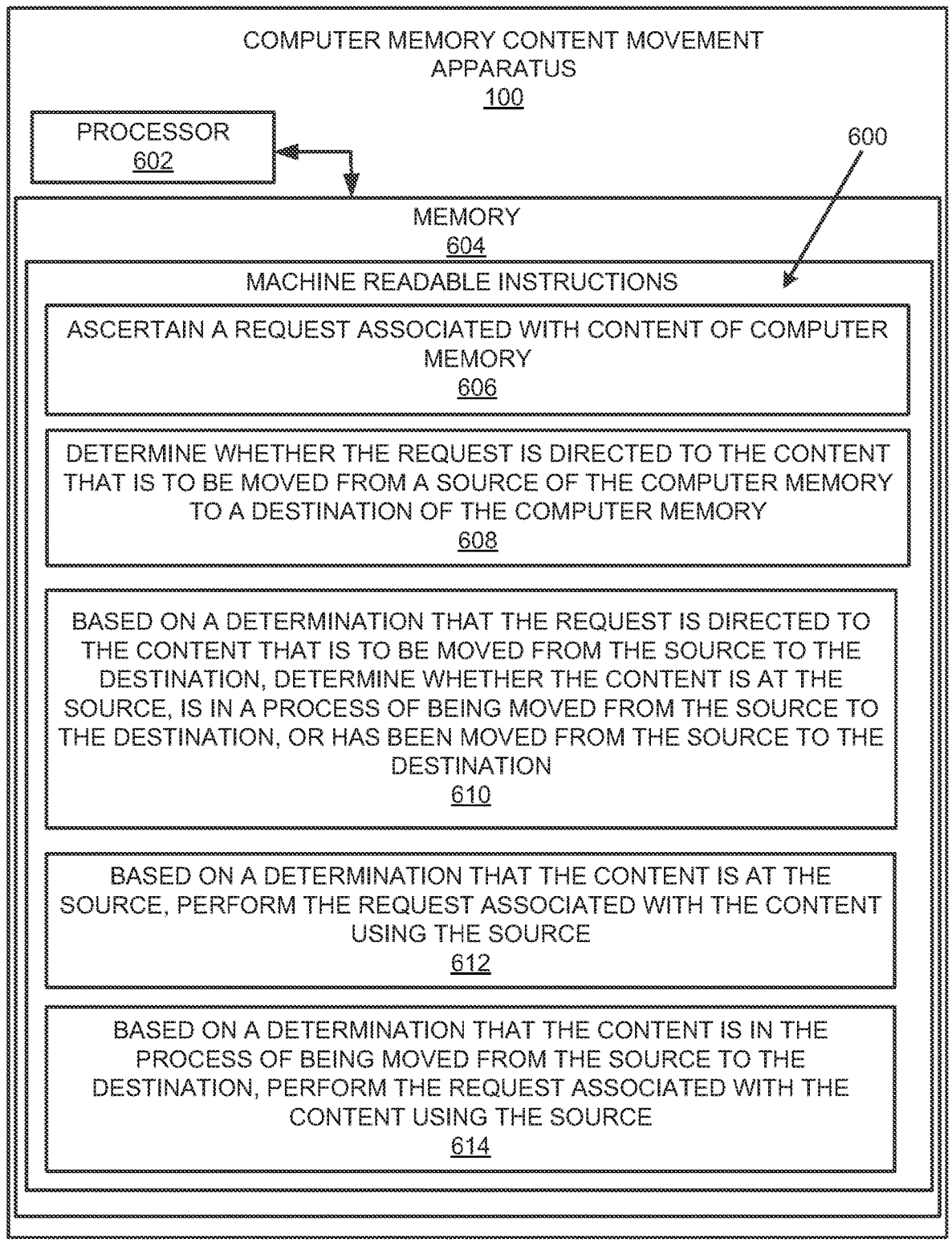
FIG. 6 illustrates a block diagram for computer memory content movement in accordance with an embodiment of the present disclosure.
Figure 6:
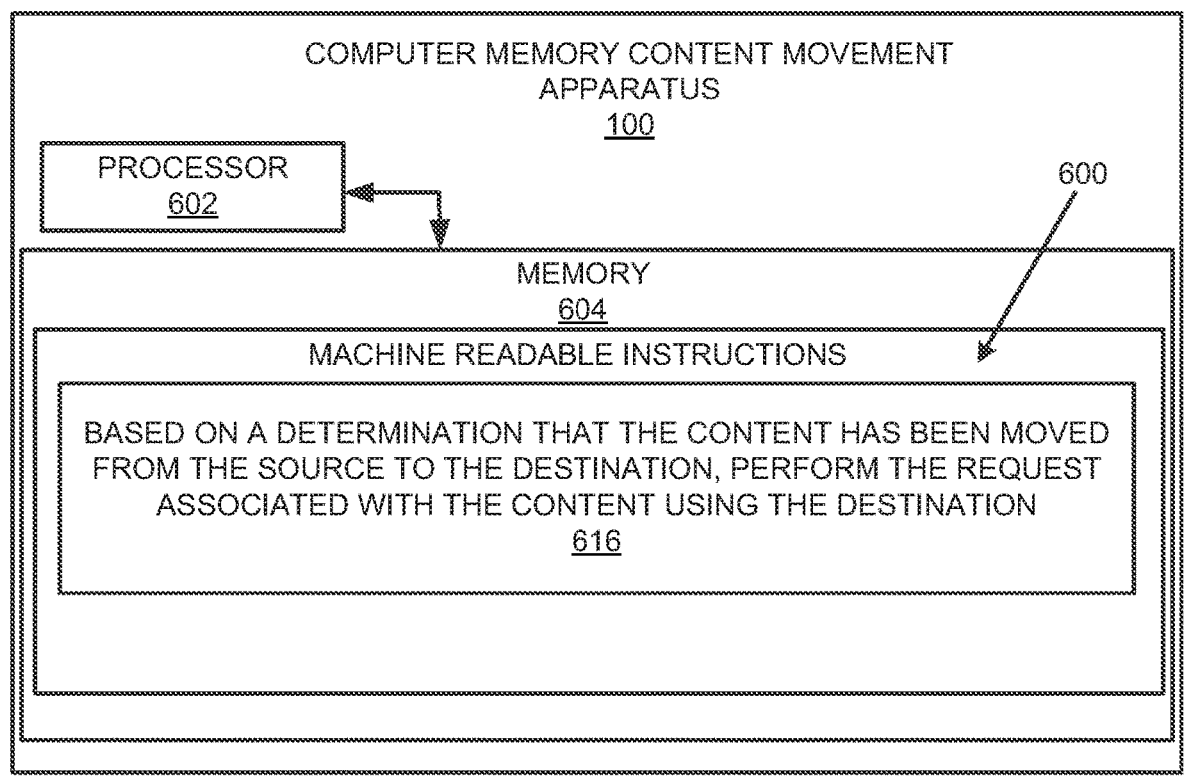
Figure 7:
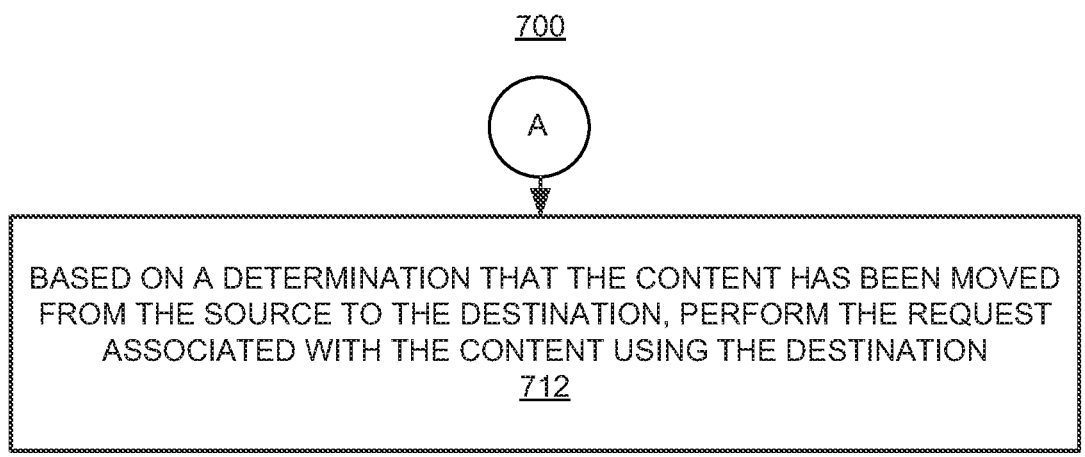
FIG. 7 illustrates a flowchart of a method for computer memory content movement in accordance with an embodiment of the present disclosure.
Figure 8:
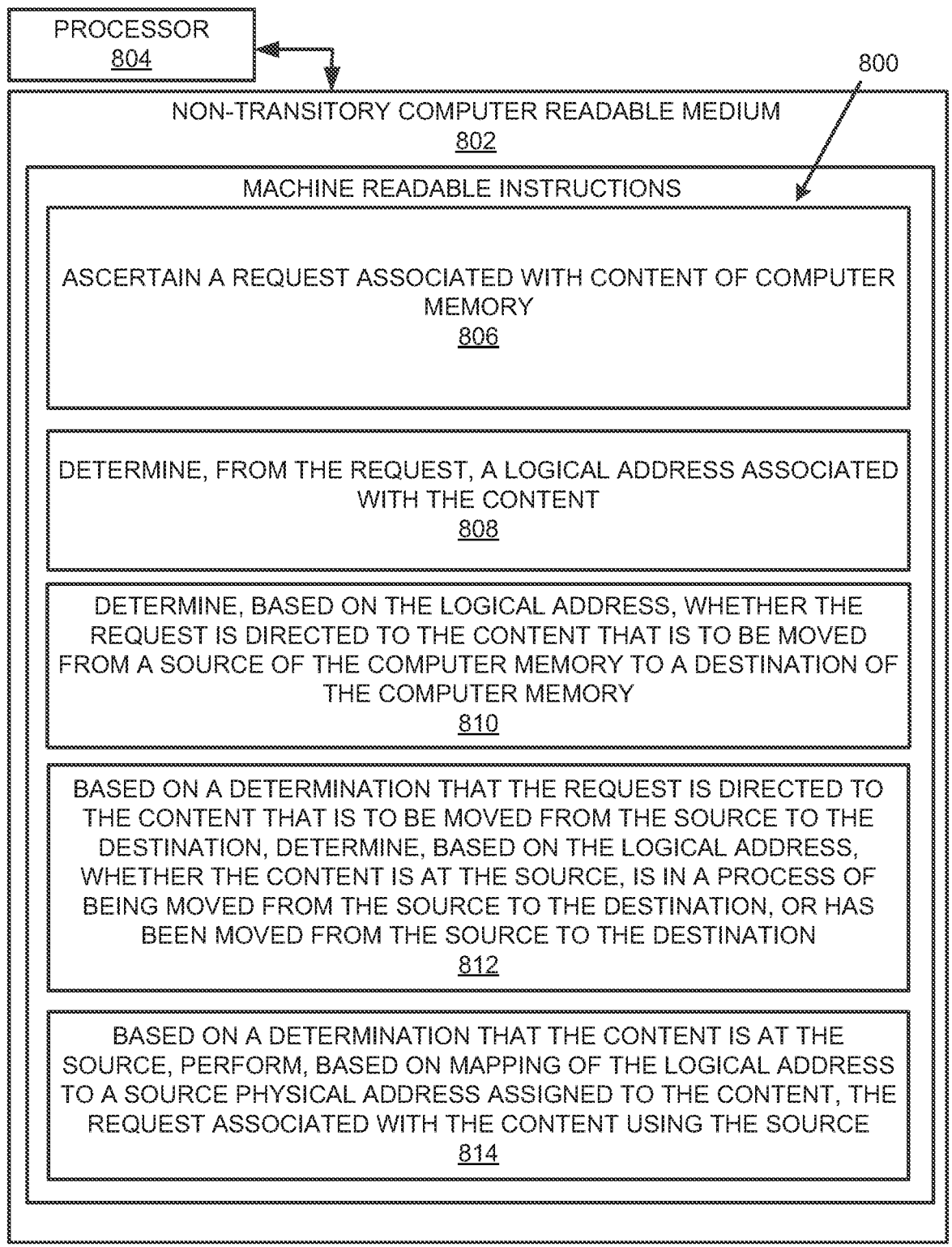
FIG. 8 illustrates a block diagram for computer memory content movement in accordance with another embodiment of the present disclosure.
Figure 8:
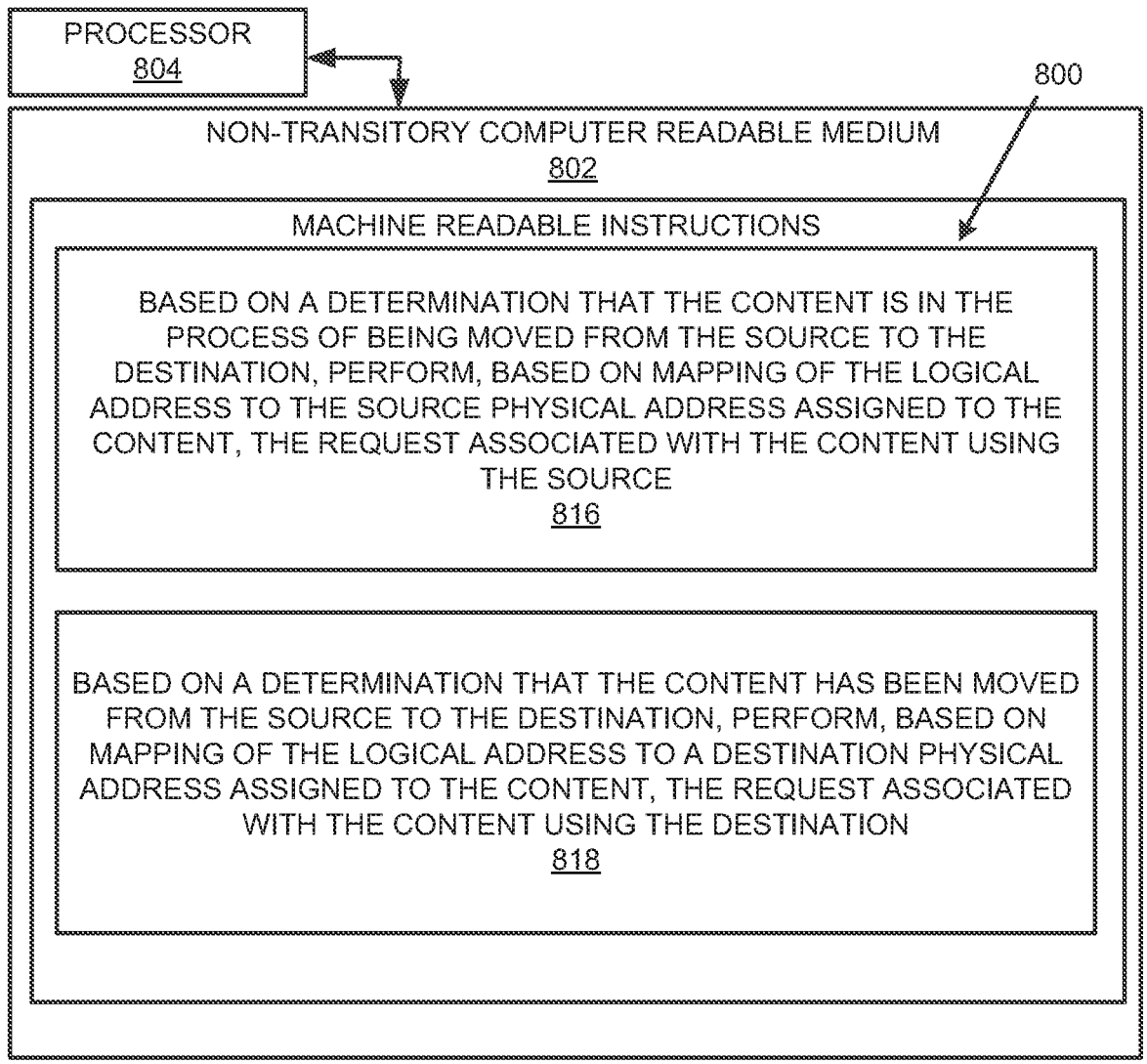

FIGS. 6-8 respectively illustrate an example block diagram 600, a flowchart of an example method 700, and a further example block diagram 800 for computer memory content movement, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for computer memory content movement, and the steps of the method. FIG. 8 may represent a non-transitory computer readable medium 802 having stored thereon machine readable instructions to provide computer memory content movement according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to ascertain a request 104 associated with content 106 of computer memory 108.

The processor 602 may fetch, decode, and execute the instructions 608 to determine whether the request 104 is directed to the content 106 that is to be moved from a source 114 of the computer memory 108 to a destination 116 of the computer memory 108.

Based on a determination that the request 104 is directed to the content 106 that is to be moved from the source 114 to the destination 116, the processor 602 may fetch, decode, and execute the instructions 610 to determine whether the content 106 is at the source 114, is in a process of being moved from the source 114 to the destination 116, or has been moved from the source 114 to the destination 116.

Based on a determination that the content 106 is at the source 114, the processor 602 may fetch, decode, and execute the instructions 612 to perform the request 104 associated with the content 106 using the source 114.

Based on a determination that the content 106 is in the process of being moved from the source 114 to the destination 116, the processor 602 may fetch, decode, and execute the instructions 614 to perform the request 104 associated with the content 106 using the source 114.

Based on a determination that the content 106 has been moved from the source 114 to the destination 116, the processor 602 may fetch, decode, and execute the instructions 616 to perform the request 104 associated with the content 106 using the destination 116.

According to examples disclosed herein, the instructions to determine whether the request 104 is directed to the content 106 that is to be moved from the source 114 to the destination 116 may further comprise instructions to cause the processor to determine, based on an analysis of a map page table 118, whether the request 104 is directed to the content 106 that is to be moved from the source 114 to the destination 116. In this regard, the map page table 118 may include an indication of whether the content 106 is located at the source 114, at the destination 116, or is to be moved from the source 114 to the destination 116. Further, the processor 602 may fetch, decode, and execute the instructions to direct guest access to the content 106 based on the indication of whether the content 106 is located at the source 114, at the destination 116, or is to be moved from the source 114 to the destination 116.

According to examples disclosed herein, the computer memory 108 may include a page 122 that includes the content 106, and the page 122 may be specified to be moved from the source 114 to the destination 116. In this regard, the instructions to determine whether the content 106 is at the source 114, is in the process of being moved from the source 114 to the destination 116, or has been moved from the source 114 to the destination 116 may further comprise instructions to cause the processor to determine, for the page 122 that includes a memory address range 124, whether the content 106 is included in a portion of the memory address range 124 for which all contents have been moved from the source 114 to the destination 116. Based on a determination that the content 106 is included in the portion of the memory address range 124, the processor 602 may fetch, decode, and execute the instructions to perform the request 104 associated with the content 106 using the destination 116. Further, based on a determination that the content 106 is not included in the portion of the memory address range 124, the processor 602 may fetch, decode, and execute the instructions to perform the request 104 associated with the content 106 using the source 114.

According to examples disclosed herein, the source 114 and the destination 116 may be assigned to different performance tiers or sections of the computer memory 108.

According to examples disclosed herein, the processor 602 may fetch, decode, and execute the instructions to assign, to the content 106, a logical address that is independent of the source 114 and the destination 116. Further, the processor 602 may fetch, decode, and execute the instructions to ascertain, from the request 104, the logical address. The processor 602 may fetch, decode, and execute the instructions to determine, based on the ascertained logical address, whether the request 104 is directed to the content 106 that is to be moved from the source 114 of the computer memory 108 to the destination 116 of the computer memory 108. Based on the determination that the content 106 is at the source 114, the processor 602 may fetch, decode, and execute the instructions to perform, based on mapping of the ascertained logical address to a source physical address (e.g., a physical address assigned to the source 114) assigned to the content 106, the request 104 associated with the content 106 using the source 114. Based on the determination that the content 106 is in the process of being moved from the source 114 to the destination 116, the processor 602 may fetch, decode, and execute the instructions to perform, based on mapping of the ascertained logical address to the source physical address assigned to the content 106, the request 104 associated with the content 106 using the source 114. Based on the determination that the content 106 has been moved from the source 114 to the destination 116, the processor 602 may fetch, decode, and execute the instructions to perform, based on mapping of the ascertained logical address to a destination physical address (e.g., a physical address assigned to the destination 116) assigned to the content 106, the request 104 associated with the content 106 using the destination 116. The source physical address and the destination physical address may be different from the ascertained logical address.

According to examples disclosed herein, the processor 602 may fetch, decode, and execute the instructions to assign, to the content 106, a logical address that is independent of the source 114 and the destination 116. The processor 602 may fetch, decode, and execute the instructions to ascertain, from the request 104, the logical address. The processor 602 may fetch, decode, and execute the instructions to determine, based on the ascertained logical address, whether the request 104 is directed to the content 106 that is to be moved from the source 114 of the computer memory 108 to the destination 116 of the computer memory 108. Based on a determination that the content 106 is to be moved from the source 114 to the destination 116, the processor 602 may fetch, decode, and execute the instructions to perform, based on a movement status of the content 106, and a mapping, based on the movement status, of the ascertained logical address to a source physical address assigned to the content 106 or a destination physical address assigned to the content 106, the request 104 associated with the content 106 using the source 114 or the destination 116. Based on a determination that the content 106 is not to be moved from the source 114 to the destination 116, the processor 602 may fetch, decode, and execute the instructions to perform, based on a location of the content 106 and the mapping of the ascertained logical address to the source physical address assigned to the content 106 or the destination physical address assigned to the content 106, the request 104 associated with the content 106 using the source 114 or the destination 116. In this regard, the source physical address and the destination physical address may be different from the ascertained logical address.

According to examples disclosed herein, the instructions to determine whether the request 104 is directed to the content 106 that is to be moved from the source 114 of the computer memory 108 to the destination 116 of the computer memory 108 further comprise instructions to cause the processor to determine whether the request 104 is directed to the content 106 that is to be copied from the source 114 of the computer memory 108 to the destination 116 of the computer memory 108.

According to examples disclosed herein, the processor 602 may fetch, decode, and execute the instructions to determine, for the content 106, whether a number of accesses to the source 114 exceeds a specified threshold for a specified time duration. Further, based on a determination, for the content 106, that the number of accesses to the source 114 exceeds the specified threshold for the specified time duration, the processor 602 may fetch, decode, and execute the instructions to indicate that the content 106 is to be moved from the source 114 to the destination 116.

Referring to FIGS. 1-5 and 7, and particularly FIG. 7, for the method 700, at block 702, the method may include ascertaining a request 104 associated with content 106 of computer memory 108.

At block 704, the method may include determining, based on an analysis of a map page table 118, whether the request 104 is directed to the content 106 that is to be moved from a source 114 of the computer memory 108 to a destination 116 of the computer memory 108. In this regard, the map page table 118 may include an indication of whether the content 106 is located at the source 114, at the destination 116, or is to be moved from the source 114 to the destination 116.

At block 706, based on a determination that the request 104 is directed to the content 106 that is to be moved from the source 114 to the destination 116, the method may include determining whether the content 106 is at the source 114, is in a process of being moved from the source 114 to the destination 116, or has been moved from the source 114 to the destination 116.

At block 708, based on a determination that the content 106 is at the source 114, the method may include performing the request 104 associated with the content 106 using the source 114.

At block 710, based on a determination that the content 106 is in the process of being moved from the source 114 to the destination 116, the method may include performing the request 104 associated with the content 106 using the source 114.

At block 712, based on a determination that the content 106 has been moved from the source 114 to the destination 116, the method may include performing the request 104 associated with the content 106 using the destination 116.

Referring to FIGS. 1-5 and 8, and particularly FIG. 8, for the block diagram 800, the non-transitory computer readable medium 802 may include instructions 806 to ascertain a request 104 associated with content 106 of computer memory 108.

The processor 804 may fetch, decode, and execute the instructions 808 to determine, from the request 104, a logical address associated with the content 106.

The processor 804 may fetch, decode, and execute the instructions 810 to determine, based on the logical address, whether the request 104 is directed to the content 106 that is to be moved from a source 114 of the computer memory 108 to a destination 116 of the computer memory 108.

Based on a determination that the request 104 is directed to the content 106 that is to be moved from the source 114 to the destination 116, the processor 804 may fetch, decode, and execute the instructions 812 to determine, based on the logical address, whether the content 106 is at the source 114, is in a process of being moved from the source 114 to the destination 116, or has been moved from the source 114 to the destination 116.

Based on a determination that the content 106 is at the source 114, the processor 804 may fetch, decode, and execute the instructions 814 to perform, based on mapping of the logical address to a source physical address assigned to the content 106 (e.g., using the map page table 118), the request 104 associated with the content 106 using the source 114.

Based on a determination that the content 106 is in the process of being moved from the source 114 to the destination 116, the processor 804 may fetch, decode, and execute the instructions 816 to perform, based on mapping of the logical address to the source physical address assigned to the content 106, the request 104 associated with the content 106 using the source 114.

Based on a determination that the content 106 has been moved from the source 114 to the destination 116, the processor 804 may fetch, decode, and execute the instructions 818 to perform, based on mapping of the logical address to a destination physical address assigned to the content 106, the request 104 associated with the content 106 using the destination 116.

According to examples disclosed herein, based on the determination that the request 104 is directed to the content 106 that is to be moved from the source 114 to the destination 116, the processor 804 may fetch, decode, and execute the instructions to prepare a reflective copy operation to begin a reflective copy of the content 106 from the source 114 to the destination 116. The processor 804 may fetch, decode, and execute the instructions to update, at the beginning of the reflective copy, a map page table 118 to direct guest access to a controller (e.g., the reflective copy module 120) associated with the reflective copy operation. The processor 804 may fetch, decode, and execute the instructions to modify, upon completion of the reflective copy operation, the map page table 118 to direct the guest access to the destination 116. Further, the processor 804 may fetch, decode, and execute the instructions to reset the controller associated with the reflective copy operation to begin a new reflective copy operation.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a processor; and
a memory storing machine readable instructions that when executed by the processor cause the processor to:
ascertain a request associated with content of computer memory;
determine whether the request is directed to the content that is to be moved from a source of the computer memory to a destination of the computer memory by determining, based on an analysis of a map page table, whether the request is directed to the content that is to be moved from the source to the destination, wherein the map page table includes an indication of whether the content is located at the source, is located at the destination, or is to be moved from the source to the destination;

based on a determination that the request is directed to the content that is to be moved from the source to the destination, initiate a reflective copy operation to begin a reflective copy of the content from the source to the destination, and determine whether the content is at the source, is in a process of being moved from the source to the destination, or has been moved from the source to the destination;

based on a determination that the content is at the source, perform the request associated with the content using the source;

update, at the beginning of the reflective copy, the map page table to direct guest access to an address of a controller associated with the reflective copy operation, and based on a determination that the content is in the process of being moved from the source to the destination, perform, using the controller, the request associated with the content using the source;

modify, upon completion of the reflective copy operation, the map page table to direct the guest access from the address of the controller associated with the reflective copy operation to the destination, and based on a determination that the content has been moved from the source to the destination, perform the request associated with the content using the destination; and reset the controller associated with the reflective copy operation to begin a new reflective copy operation.

2. The apparatus according to claim 1, wherein the computer memory includes a page that includes the content, the page is to be moved from the source to the destination, and the instructions to determine whether the content is at the source, in the process of being moved from the source to the destination, or has been moved from the source is to the destination further comprise instructions to cause the processor to:

determine, for the page that includes a memory address range, whether the content is included in a portion of the memory address range for which all contents have been moved from the source to the destination;

based on a determination that the content is included in the portion of the memory address range, perform the request associated with the content using the destination; and based on a determination that the content is not included in the portion of the memory address range, perform the request associated with the content using the source.

3. The apparatus according to claim 1, wherein the source and the destination are assigned to different performance tiers or sections of the computer memory.

4. The apparatus according to claim 1, wherein the instructions to ascertain the request associated with content of computer memory, determine whether the request is directed to the content that is to be moved from the source of the computer memory to the destination of the computer memory, based on the determination that the content is at the source, perform the request associated with the content using the source, update, at the beginning of the reflective copy, the map page table to direct guest access to the address of the controller associated with the reflective copy operation, and based on the determination that the content is in the process of being moved from the source to the destination, perform, using the controller, the request associated with the content using the source, and modify, upon completion of the reflective copy operation, the map page table to direct the guest access from the address of the controller associated with the reflective copy operation to the destination, and based on the determination that the content has been moved from the source to the destination, perform the request associated with the content using the destination further comprise instructions to cause the processor to:

assign, to the content, a logical address that is independent of the source and the destination;

ascertain, from the request, the logical address;

determine, based on the ascertained logical address, whether the request is directed to the content that is to be moved from the source of the computer memory to the destination of the computer memory;

based on the determination that the content is at the source, perform, based on mapping of the ascertained logical address to a source physical address assigned to the content, the request associated with the content using the source;

update, at the beginning of the reflective copy, the map page table to direct guest access to the address of the controller associated with the reflective copy operation, and based on the determination that the content is in the process of being moved from the source to the destination, perform, using the controller, based on mapping of the ascertained logical address to the source physical address assigned to the content, the request associated with the content using the source; and modify, upon completion of the reflective copy operation, the map page table to direct the guest access from the address of the controller associated with the reflective copy operation to the destination, and based on the determination that the content has been moved from the source to the destination, perform, based on mapping of the ascertained logical address to a destination physical address assigned to the content, the request associated with the content using the destination, wherein the source physical address and the destination physical address are different from the ascertained logical address.

5. The apparatus according to claim 1, wherein the instructions to ascertain the request associated with content of computer memory, and determine whether the request is directed to the content that is to be moved from the source of the computer memory to the destination of the computer memory further comprise instructions to cause the processor to:

assign, to the content, a logical address that is independent of the source and the destination;

ascertain, from the request, the logical address;

determine, based on the ascertained logical address, whether the request is directed to the content that is to be moved from the source of the computer memory to the destination of the computer memory;

based on a determination that the content is to be moved from the source to the destination, perform, based on a movement status of the content, and a mapping, based on the movement status, of the ascertained logical address to a source physical address assigned to the content or a destination physical address assigned to the content, the request associated with the content using the source or the destination; and based on a determination that the content is not to be moved from the source to the destination, perform, based on a location of the content and the mapping of the ascertained logical address to the source physical address assigned to the content or the destination physical address assigned to the content, the request associated with the content using the source or the destination, wherein the source physical address and the destination physical address are different from the ascertained logical address.

6. The apparatus according to claim 1, wherein the instructions to determine whether the request is directed to the content that is to be moved from the source of the computer memory to the destination of the computer memory further comprise instructions to cause the processor to:

determine whether the request is directed to the content that is to be copied from the source of the computer memory to the destination of the computer memory.

7. The apparatus according to claim 1, wherein the instructions are further to cause the processor to:

determine, for the content, whether a number of accesses to the source is less than a specified threshold for a specified time duration; and based on a determination, for the content, that the number of accesses to the source is less than the specified threshold for the specified time duration, indicate that the content is to be moved from the source to the destination.

8. The apparatus according to claim 1, wherein the instructions are further to cause the processor to:

determine, for the content, whether a number of accesses to the source exceeds a specified threshold for a specified time duration;

based on a determination, for the content, that the number of accesses to the source exceeds the specified threshold for the specified time duration, indicate that the content is to be moved from the source to the destination;

determine, for the content, whether the number of accesses to the source is less than the specified threshold for the specified time duration; and based on a determination, for the content, that the number of accesses to the source is less than the specified threshold for the specified time duration, indicate that the content is to be moved from the source to another destination.

9. The apparatus according to claim 1, wherein the instructions are further to cause the processor to:

determine, for the content, whether a number of accesses to the source exceeds a specified threshold for a specified time duration;

based on a determination, for the content, that the number of accesses to the source exceeds the specified threshold for the specified time duration, indicate that the content is to be moved from the source to the destination;

determine, for the content, whether the number of accesses to the source is less than another specified threshold for another specified time duration; and based on a determination, for the content, that the number of accesses to the source is less than the other specified threshold for the other specified time duration, indicate that the content is to be moved from the source to another destination.

10. A computer implemented method comprising:

ascertaining, by at least one processor, a request associated with content of computer memory;

determining, by the at least one processor and based on an analysis of a map page table, whether the request is directed to the content that is to be moved from a source of the computer memory to a destination of the computer memory, wherein the map page table includes an indication of whether the content is located at the source, at the destination, or is to be moved from the source to the destination;

based on a determination that the request is directed to the content that is to be moved from the source to the destination, initiating a reflective copy operation to begin a reflective copy of the content from the source to the destination, and determining, by the at least one processor, whether the content is at the source, is in a process of being moved from the source to the destination, or has been moved from the source to the destination;

based on a determination that the content is at the source, performing, by the at least one processor, the request associated with the content using the source;

updating, at the beginning of the reflective copy, the map page table to direct guest access to an address of a controller associated with the reflective copy operation, and based on a determination that the content is in the process of being moved from the source to the destination, performing, by the at least one processor, using the controller, the request associated with the content using the source; and modifying, upon completion of the reflective copy operation, the map page table to direct the guest access from the address of the controller associated with the reflective copy operation to the destination, and based on a determination that the content has been moved from the source to the destination, performing, by the at least one processor, the request associated with the content using the destination.

11. The computer implemented method according to claim 10, wherein the computer memory includes a page that includes the content, the page is to be moved from the source to the destination, and determining, by the at least one processor, whether the content is at the source, is in the process of being moved from the source to the destination, or has been moved from the source to the destination further comprises:

determining, by the at least one processor and for the page that includes a memory address range, whether the content is included in a portion of the memory address range for which all contents have been moved from the source to the destination;

based on a determination that the content is included in the portion of the memory address range, performing, by the at least one processor, the request associated with the content using the destination; and based on a determination that the content is not included in the portion of the memory address range, performing, by the at least one processor, the request associated with the content using the source.

12. The computer implemented method according to claim 10, further comprising:

assigning, by the at least one processor, the source and the destination to different performance tiers of the computer memory.

13. The computer implemented method according to claim 10, wherein determining, by the at least one processor and based on the analysis of the map page table, whether the request is directed to the content that is to be moved from the source of the computer memory to the destination of the computer memory further comprises:

determining, by the at least one processor and based on the analysis of the map page table, whether the request is directed to the content that is to be copied from the source of the computer memory to the destination of the computer memory.

14. The computer implemented method according to claim 10, further comprising:
   determining, by the at least one processor and for the content, whether a number of accesses to the source is less than a specified threshold for a specified time duration; and
   based on a determination, for the content, that the number of accesses to the source is less than the specified threshold for the specified time duration, indicating, by the at least one processor, that the content is to be moved from the source to the destination.

15. The computer implemented method according to claim 10, wherein ascertaining, by the at least one processor, the request associated with content of computer memory, determining, by the at least one processor and based on an analysis of a map page table, whether the request is directed to the content that is to be moved from the source of the computer memory to the destination of the computer memory, based on the determination that the content is at the source, performing, by the at least one processor, the request associated with the content using the source, updating, at the beginning of the reflective copy, the map page table to direct guest access to the address of the controller associated with the reflective copy operation, and based on the determination that the content is in the process of being moved from the source to the destination, performing, by the at least one processor, using the controller, the request associated with the content using the source, and modifying, upon completion of the reflective copy operation, the map page table to direct the guest access from the address of the controller associated with the reflective copy operation to the destination, and based on the determination that the content has been moved from the source to the destination, performing, by the at least one processor, the request associated with the content using the destination further comprises:
   assigning, by the at least one processor and to the content, a logical address that is independent of the source and the destination;
   ascertaining, by the at least one processor and from the request, the logical address;
   determining, by the at least one processor and based on the ascertained logical address, whether the request is directed to the content that is to be moved from the source of the computer memory to the destination of the computer memory;
   based on the determination that the content is at the source, performing, by the at least one processor and based on mapping of the ascertained logical address to a source physical address assigned to the content, the request associated with the content using the source;
   updating, at the beginning of the reflective copy, the map page table to direct guest access to the address of the controller associated with the reflective copy operation, and based on the determination that the content is in the process of being moved from the source to the destination, performing, by the at least one processor, using the controller, and based on mapping of the ascertained logical address to the source physical address assigned to the content, the request associated with the content using the source; and
   modifying, upon completion of the reflective copy operation, the map page table to direct the guest access from the address of the controller associated with the reflective copy operation to the destination, and based on the determination that the content has been moved from the source to the destination, performing, by the at least one processor and based on mapping of the ascertained logical address to a destination physical address assigned to the content, the request associated with the content using the destination,
   wherein the source physical address and the destination physical address are different from the ascertained logical address.

16. The computer implemented method according to claim 10, wherein ascertaining, by the at least one processor, the request associated with content of computer memory, and determining, by the at least one processor, whether the request is directed to the content that is to be moved from the source of the computer memory to the destination of the computer memory further comprises:
   assigning, by the at least one processor and to the content, a logical address that is independent of the source and the destination;
   ascertaining, by the at least one processor and from the request, the logical address;
   determining, by the at least one processor and based on the ascertained logical address, whether the request is directed to the content that is to be moved from the source of the computer memory to the destination of the computer memory;
   based on a determination that the content is to be moved from the source to the destination, performing, by the at least one processor and based on
      a movement status of the content, and
      a mapping, based on the movement status, of the ascertained logical address to a source physical address assigned to the content or a destination physical address assigned to the content, the request associated with the content using the source or the destination; and
   based on a determination that the content is not to be moved from the source to the destination, performing, by the at least one processor and based on a location of the content and the mapping of the ascertained logical address to the source physical address assigned to the content or the destination physical address assigned to the content, the request associated with the content using the source or the destination,
   wherein the source physical address and the destination physical address are different from the ascertained logical address.

17. A non-transitory computer readable medium having stored thereon machine readable instructions, the machine readable instructions, when executed by a processor, cause the processor to:
   ascertain a request associated with content of computer memory;
   determine, from the request, a logical address associated with the content;
   determine, based on the logical address and based on an analysis of a map page table, whether the request is directed to the content that is to be moved from a source of the computer memory to a destination of the computer memory, wherein the map page table includes an indication of whether the content is located at the source, at the destination, or is to be moved from the source to the destination;
   based on a determination that the request is directed to the content that is to be moved from the source to the destination, initiate a reflective copy operation to begin a reflective copy of the content from the source to the destination, and determine, based on the logical address, whether the content is at the source, is in a process of being moved from the source to the destination, or has been moved from the source to the destination;

based on a determination that the content is at the source, perform, based on mapping of the logical address to a source physical address assigned to the content, the request associated with the content using the source;

update, at the beginning of the reflective copy, the map page table to direct guest access to an address of a controller associated with the reflective copy operation, and based on a determination that the content is in the process of being moved from the source to the destination, perform, using the controller and based on mapping of the logical address to the source physical address assigned to the content, the request associated with the content using the source; and modify, upon completion of the reflective copy operation, the map page table to direct the guest access from the address of the controller associated with the reflective copy operation to the destination, and based on a determination that the content has been moved from the source to the destination, perform, based on mapping of the logical address to a destination physical address assigned to the content, the request associated with the content using the destination, wherein the source physical address and the destination physical address are different from the logical address.

18. The non-transitory computer readable medium according to claim 17, wherein the computer memory includes a page that includes the content, the page is to be moved from the source to the destination, and the machine readable instructions to determine, based on the logical address, whether the content is at the source, is in the process of being moved from the source to the destination, or has been moved from the source to the destination, when executed by the processor, further cause the processor to:

determine, for the page that includes a memory address range, whether the content is included in a portion of the memory address range for which all contents have been moved from the source to the destination;

based on a determination that the content is included in the portion of the memory address range, perform the request associated with the content using the destination; and based on a determination that the content is not included in the portion of the memory address range, perform the request associated with the content using the source.

\* \* \* \* \*